(12) United States Patent
Doerenberg et al.

(10) Patent No.: US 7,206,877 B1
(45) Date of Patent: Apr. 17, 2007

(54) FAULT TOLERANT DATA COMMUNICATION NETWORK

(75) Inventors: Frank M. G. Doerenberg, Redmond, WA (US); Michael Topic, Redmond, WA (US)

(73) Assignee: Honeywell International Inc., Morristown, NJ (US)

( * ) Notice: Subject to any disclaimer, the term of this patent is extended or adjusted under 35 U.S.C. 154(b) by 0 days.

(21) Appl. No.: 09/454,057

(22) Filed: Dec. 2, 1999

Related U.S. Application Data

(60) Provisional application No. 60/113,787, filed on Dec. 22, 1998.

(51) Int. Cl.
*G06F 13/00* (2006.01)
*G06F 13/42* (2006.01)

(52) U.S. Cl. .................. 710/100; 710/106; 710/107; 710/110

(58) Field of Classification Search .............. 370/445, 370/408, 474; 714/11; 710/56, 126, 29, 710/45, 117, 124, 25, 30, 34, 39, 100, 106, 710/107; 709/239
See application file for complete search history.

(56) References Cited

U.S. PATENT DOCUMENTS

| | | | | |
|---|---|---|---|---|
| 3,755,628 A | * | 8/1973 | Games et al. | 370/445 |
| 4,004,283 A | | 1/1977 | Bennett et al. | 340/172.5 |
| 4,020,472 A | | 4/1977 | Bennett et al. | 340/172.5 |
| 4,068,298 A | | 1/1978 | Dechant et al. | 364/200 |
| 4,086,627 A | | 4/1978 | Bennett et al. | 364/200 |
| 4,087,855 A | | 5/1978 | Bennett et al. | 364/200 |
| 4,264,893 A | * | 4/1981 | Hutch | 340/825.01 |
| 4,266,270 A | | 5/1981 | Daniels et al. | 364/200 |
| 4,355,388 A | | 10/1982 | Deal, Jr. | 370/104 |
| 4,426,697 A | * | 1/1984 | Petersen et al. | 370/438 |
| 4,701,878 A | | 10/1987 | Gunkel et al. | 364/900 |
| 4,734,907 A | | 3/1988 | Turner | 370/60 |
| 4,813,038 A | | 3/1989 | Lee | 370/60 |
| 4,825,438 A | | 4/1989 | Bennett et al. | 371/8 |
| 4,829,227 A | | 5/1989 | Turner | 370/60 |
| 4,829,293 A | | 5/1989 | Schlater | 340/722 |
| 4,901,309 A | | 2/1990 | Turner | 370/60 |
| 4,905,236 A | | 2/1990 | Leibe et al. | 370/110.1 |
| 4,961,141 A | | 10/1990 | Hopkins et al. | 364/200 |
| 5,175,800 A | | 12/1992 | Galis et al. | 395/51 |
| 5,193,167 A | | 3/1993 | Sites et al. | 395/425 |
| 5,193,175 A | | 3/1993 | Cutts, Jr. et al. | 395/575 |
| 5,255,367 A | | 10/1993 | Bruckert et al. | 395/200 |
| 5,276,823 A | | 1/1994 | Cutts, Jr. et al. | 395/182 |
| 5,283,646 A | | 2/1994 | Bruder | 348/415 |
| 5,313,582 A | * | 5/1994 | Hendel et al. | 710/56 |
| 5,317,726 A | | 5/1994 | Horst | 395/575 |
| 5,325,517 A | * | 6/1994 | Baker et al. | 714/11 |
| 5,367,705 A | | 11/1994 | Sites et al. | 395/800 |

(Continued)

Primary Examiner—Heather R. Herndon
Assistant Examiner—Chau Nguyen
(74) Attorney, Agent, or Firm—Black Lowe & Graham PLLC

(57) ABSTRACT

The present invention provides a fault tolerant bus architecture and protocol for use in an Integrated Hazard Avoidance System of the type generally used in avionics applications. In addition, the present invention may also be used in applications, aviation and otherwise, wherein data is to be handled with a high degree of integrity and in a fault tolerant manner. Such applications may include for example, the banking industry or other safety critical processing functions, including but not limited to environmental control.

12 Claims, 11 Drawing Sheets

U.S. PATENT DOCUMENTS

| | | | | |
|---|---|---|---|---|
| 5,384,767 A * | 1/1995 | Moorwood et al. | | 370/408 |
| 5,388,242 A | 2/1995 | Jewett | | 395/425 |
| 5,410,660 A | 4/1995 | Divine et al. | | 395/375 |
| 5,410,682 A | 4/1995 | Sites et al. | | 395/800 |
| 5,440,549 A | 8/1995 | Min et al. | | 370/60 |
| 5,440,751 A | 8/1995 | Santeler et al. | | 395/800 |
| 5,469,551 A | 11/1995 | Sites et al. | | 395/375 |
| 5,491,787 A | 2/1996 | Hashemi | | 395/182.09 |
| 5,493,497 A * | 2/1996 | Buus | | 701/4 |
| 5,493,687 A | 2/1996 | Garg et al. | | 395/800 |
| 5,560,035 A | 9/1996 | Garg et al. | | 395/800 |
| 5,561,779 A | 10/1996 | Jackson et al. | | 395/449 |
| 5,568,624 A | 10/1996 | Sites et al. | | 395/375 |
| 5,574,849 A | 11/1996 | Sonnier et al. | | 395/182.1 |
| 5,588,111 A | 12/1996 | Cutts, Jr. et al. | | 396/182.07 |
| 5,652,846 A | 7/1997 | Sides | | 395/288 |
| 5,675,751 A | 10/1997 | Baker et al. | | 395/309 |
| 5,682,546 A | 10/1997 | Garg et al. | | 395/800 |
| 5,701,450 A | 12/1997 | Duncan | | 395/595 |
| 5,715,440 A | 2/1998 | Ohmura et al. | | 395/580 |
| 5,724,572 A | 3/1998 | Dieffenderfer et al. | | 395/606 |
| 5,740,353 A | 4/1998 | Kreulen et al. | | 395/183.18 |
| 5,778,203 A * | 7/1998 | Birkedahl et al. | | 709/250 |
| 5,787,256 A * | 7/1998 | Marik et al. | | 370/474 |
| 5,796,935 A * | 8/1998 | Morrison et al. | | 714/11 |
| 5,809,220 A * | 9/1998 | Morrison et al. | | 714/12 |
| 6,002,347 A * | 12/1999 | Daly et al. | | 340/963 |
| 6,018,782 A * | 1/2000 | Hartmann | | 710/129 |
| 6,127,944 A * | 10/2000 | Daly et al. | | 340/963 |
| 6,133,846 A * | 10/2000 | Birkedahl et al. | | 370/458 |
| 6,467,003 B1 * | 10/2002 | Doerenberg et al. | | 710/117 |
| 6,597,691 B1 * | 7/2003 | Anderson et al. | | 370/360 |

* cited by examiner

FAULT TOLERANT DATA COMMUNICATION NETWORK

This application claims the benefit of U.S. Provisional Application Ser. No. 60/113,787, filed in the names of Frank M. G. Doerenberg and Michael Topic on Dec. 22, 1998, the complete disclosure of which is incorporated herein by reference.

This application is related to U.S. application Ser. No. 09/009,463, filed in the names of Frank M. G. Doerenberg and James McElroy on Jan. 20, 1998, which is a Continuation of U.S. Provisional Application Ser. No. 60/035,856 filed Jan. 21, 1997, and U.S. application Ser. No. 09/454,054, filed in the names of Frank M. G. Doerenberg and Michael Topic on the same date herewith, which is a Continuation of U.S. application Ser. No. 09/009,463, the complete disclosures of which are incorporated herein by reference.

FIELD OF THE INVENTION

This invention relates to fault tolerant data bus architectures and more particularly to use of such architectures in safety critical avionics.

BACKGROUND OF THE INVENTION

It is generally recognized that there is a need to employ digital computers in applications in which improper operation could have severe consequences. For example, a sophisticated flight hazard warning system has been developed for aircraft which utilizes a number of independent warning systems including a ground proximity warning system, a wind shear detection system and a collision avoidance system. This particular system is generally described in U.S. patent application Ser. No. 08/847,328, filed Apr. 23, 1997 and entitled: "Integrated Hazard Avoidance System", and is incorporated herein by reference. In the preferred embodiment described therein, a central computer, which may include multiple processors for redundancy, receives via various input/output (I/O) modules various types of flight data useful for anticipating and warning of hazardous flight conditions. Such information may include but is not limited to: barometric altitude, radio altitude, roll and pitch, airspeed, flap setting, gear position, and navigation data. This information is communicated to the central computer via a data bus.

For such an integrated warning system to provide warnings with a high degree of integrity, the data operated upon and instructions issued by the central computer must be accurate. A bus architecture to transfer data between each of the I/O modules in an orderly manner must therefore exist. Data placed on the bus must also be accurate and without error. Also, it is important to ensure, to the extent possible, that the individual systems execute the warning programs correctly.

There have been various approaches to solving these problems. For example such a system is described in ARINC Specification 659 entitled Backplane Data Bus published on Dec. 27, 1993 by Aeronautical Radio, Inc. In this system the bus includes four data lines and has a pair of Bus Interface Units ("BIU") for each processor or node on the data system where each BIU is connected to two data lines in the bus. Data is transferred according to a time schedule contained in a table memory associated with each BIU. The tables define the length of time windows on the bus and contain the source and destination addresses in the processor memory for each message transmitted on the bus. These types of systems also use for some applications two processors that operate in a lock-step arrangement with additional logic provided to cross-compare the activity of the two processors. The two processors, each with its own memory, execute identical copies of a software application in exact synchrony. This approach usually requires that the two processors must be driven by clock signals that are synchronized.

Although such systems have high data integrity and provide for fault tolerant operation, they have a number of disadvantages. For example the use of tables having data source and destination addresses for each application program in the processor memory makes it difficult to reprogram the system for new applications because each table in the system must be reprogrammed. In addition, the use of two processor operating in lock-step reduces the flexibility of the system since it is not possible to run two different programs on the processors at the same time.

Application Ser. No. 09/009,463 discloses a fault tolerant bus architecture and protocol for use in an Integrated Hazard Avoidance System of the type generally described therein as well as other applications, aviation and otherwise, wherein data is to be handled with a high degree of integrity and in a fault tolerant manner. The system is partitioned into modules and an inter-module backplane data bus is shared between the modules to transfer data between the modules. The modules themselves may host multiple application functions that also share the backplane bus. The backplane bus is fault tolerant, multi-drop, time-multiplexed broadcast bus in which serial data is preferably transferred in a semi-duplex manner. Each module, or fault containment node, includes a single source microprocessor that executes instructions to place data onto the bus. Bus interface controllers, each with an independently driven clock, compare the retrieved data. If the interface controllers are in agreement, the data is placed on the bus.

According to co-pending application Ser. No. 09/009,463, the data is preferably placed on the bus using a data bus protocol that allocates to each node a predetermined number of slots in which to transmit. Each module contains a time table memory associated with each bus interface controller that stores the bus protocol information to enable the node to place data in a predetermined channel on the bus at the appropriate time period. A space table associated with each bus interface controller indicates the address space in a processor memory from which the data is to be transferred to the bus.

Co-pending application Ser. No. 09/454,054 provides an improvement over the disclosure of application Ser. No. 09/009,563 having a simplified time deterministic bus traffic protocol that is independent of the communication protocol and the number of sub-busses.

Although such systems have high data integrity and provide for fault tolerant operation, alternative bus topology can enhance the data integrity and fault tolerant operation of such systems.

SUMMARY OF THE INVENTION

The present invention provides a fault tolerant bus architecture and protocol for use in an Integrated Hazard Avoidance System of the type generally described above. In addition, the present invention may also be used in applications, aviation and otherwise, wherein data is to be handled with a high degree of integrity and in a fault tolerant manner. Such applications may include for example, the banking industry or other safety critical processing functions, including but not limited to environmental control.

In the present invention as applied to an integrated flight hazard avoidance system, the system is partitioned into modules. An inter-module backplane data bus is shared between the modules to transfer data between the modules. The backplane bus according to the present invention is fault tolerant, multi-drop, time-multiplexed broadcast bus. The inter-module backplane bus includes multiple independent data lines grouped into multiple data communication networks. In a preferred embodiment, the inter-module backplane bus includes four independent data lines divided into two data communication networks each having two data lines. Each module is provided with reception privileges on one or more of the data lines of each data communication network. In a preferred embodiment, each module is provided with reception privileges on all of the data lines of each data communication network, while restricted to transmission privileges on less than all of the data lines of each data communication network. For example, in a backplane bus having dual data communication networks, each including dual independent data lines, each module has transmission privileges on only one of each data line of each data communication network, while enjoying reception privileges on both data lines of both data communication networks. Alternatively, according to another embodiment of the invention, each module has transmission privileges on only one of each data line of each data communication network, while reception privileges are restricted to the other of the two data lines of each data communication network. The modules themselves may host multiple application functions that also share the backplane bus. In a preferred embodiment of the invention, serial data is transferred in a semi-duplex manner.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DETAILED DESCRIPTION OF PREFERRED EMBODIMENT

In the Figures, like numerals indicate like elements.

Figure 1:
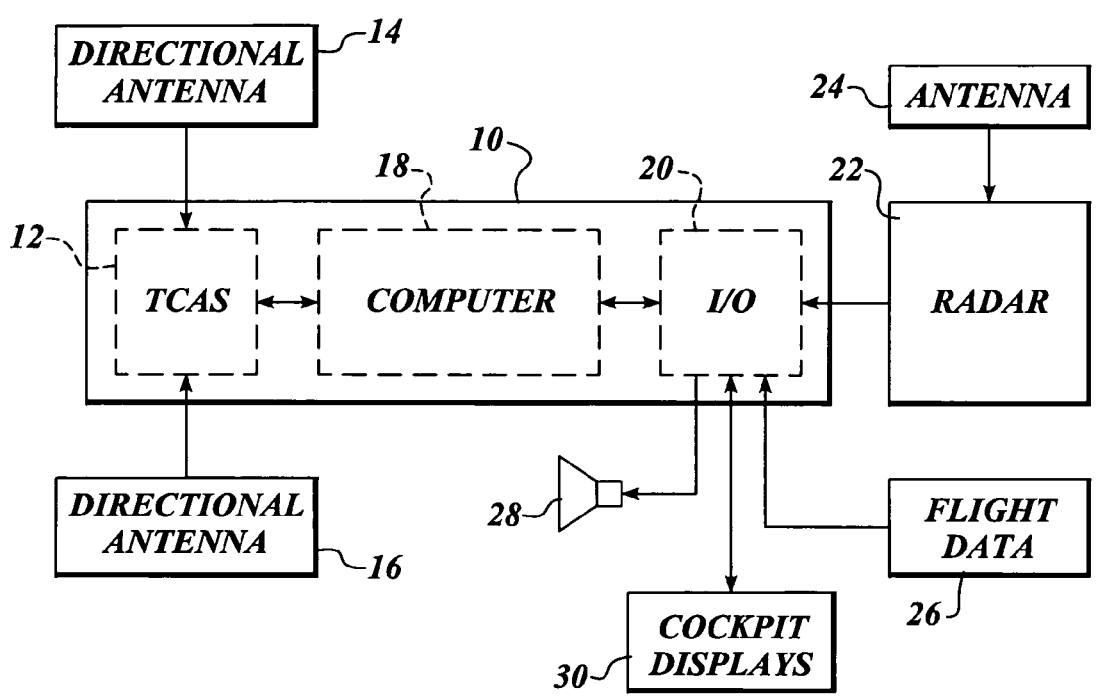
FIG. 1 is a block diagram of an integrated hazard avoidance system illustrating an application of a data bus system according to the invention.

FIG. 1 details in block diagram form an integrated hazard avoidance system (IHAS) 10 for aircraft to illustrate a system in which the data bus system of the present invention can be incorporated. Because the IHAS 10 includes a number of microprocessor based systems as well as receiving data from other systems, it is desirable that data be transmitted with a high degree of integrity between the various components of the system. Included in the IHAS 10 is a conventional traffic alert and collision avoidance system (TCAS) 12 which is connected to a pair of directional antennae 14 and 16. A central computer 18 is connected to TCAS 10 and to I/O module 20. Central computer 18, which can include multiple processors for redundancy, performs the hazard detecting and alerting functions as described in provisional application 60/016,277 incorporated herein by reference. Flight data as indicated generally by block 26 are input to the central computer 10 via I/O module 20.

Central computer 18 uses conventional programs for generating the basic ground proximity warnings (GPWS) including enhanced ground proximity warnings (EGPWS), windshear warnings including predictive and reactive windshear alerts, and TCAS alerts. Descriptions of suitable GPWS systems are provided in U.S. Pat. Nos. 4,567,483, 5,220,322; 4,433,323; 5,187,478 and 4,684,948 all of which are hereby incorporated by reference. Descriptions of suitable EGPWS systems are provided in patent application Ser. Nos. 08/509,660 and 08/509,702 which are hereby incorporated by reference. Suitable windshear systems are described in U.S. Pat. Nos. 4,905,000; 5,059,964, 4,725,811; 4,947, 164; 5,153,588 and 4,891,642 and are hereby incorporated by reference. Suitable commercially available TCAS systems and associated hardware are described in U.S. Pat. Nos. 5,122,808; 5,272,725; 4,914,733; 5,008,844 and 4,855,748 and in published documents: "Pilot's Guide TCAS II CAS 67/A81A Bendix/King Traffic Alert and Collision Avoidance Systems" and "Pilot's Guide CAS 66A Bendix/King TCAS I Collision Avoidance System" and are hereby all incorporated by reference.

The IHAS 10 of FIG. 1 may host applications of any criticality level form non-essential to flight critical. The system architecture allows new applications to be added through software changes, without requiring additional hardware, by employing central processors along with common power and I/O interfaces. The IHAS system is not merely a collection of individual functions packaged in a single unit. IHAS is a complete system design with hardware processing modules, such as I/O modules, processor units and a dual power supply. A current exception to this philosophy are the TCAS/Mode S RF module, and the Radar RF module. The reason for these exceptions is that the highly specialized functions are more optimally included in other than the general processing hardware.

One possible set of functions for IHAS includes:

Weather Radar with Predictive Windshear Detection

Ground Proximity Warning with Reactive Windshear Detection

Traffic Alert and Collision Avoidance System

Mode Select Transponder

Flight Data Acquisition Unit and Data Management System

Other functions and combinations of functions can also be included in the IHAS 10. The IHAS design provides an open architecture environment that allows functions and components to be developed by the aircraft manufacturer, airline or other vendors.

By centralizing the crew alerting functions of the hazard warning systems included in the IHAS 10, the IHAS 10 can eliminate conflicting and redundant crew messages and provide optimal message prioritization. The present invention, permits the exchange of data from each of the modules of IHAS in a manner that ensures data integrity as well as in a fault tolerant manner. The data bus architecture of the present invention thus permits an integrated hazard warning device for aviation to operate with robustness and integrity of data processing and with the obvious safety benefits thereof. False or inaccurate warnings are thereby reduced or eliminated and the likelihood that a warning will fail to be given is also reduced or eliminated. Furthermore, as discussed in detail below, the present invention also provides for application specific levels of robustness and fault tolerance depending upon user preference or the safety criticality of the associated application.

Although a preferred embodiment of the present invention is described in connection with the IHAS application shown in FIG. 1, it is to be understood that the present invention is applicable to any application where fault tolerant and robust data processing bus architectures are desirable.

Basic Architecture

Figure 2:
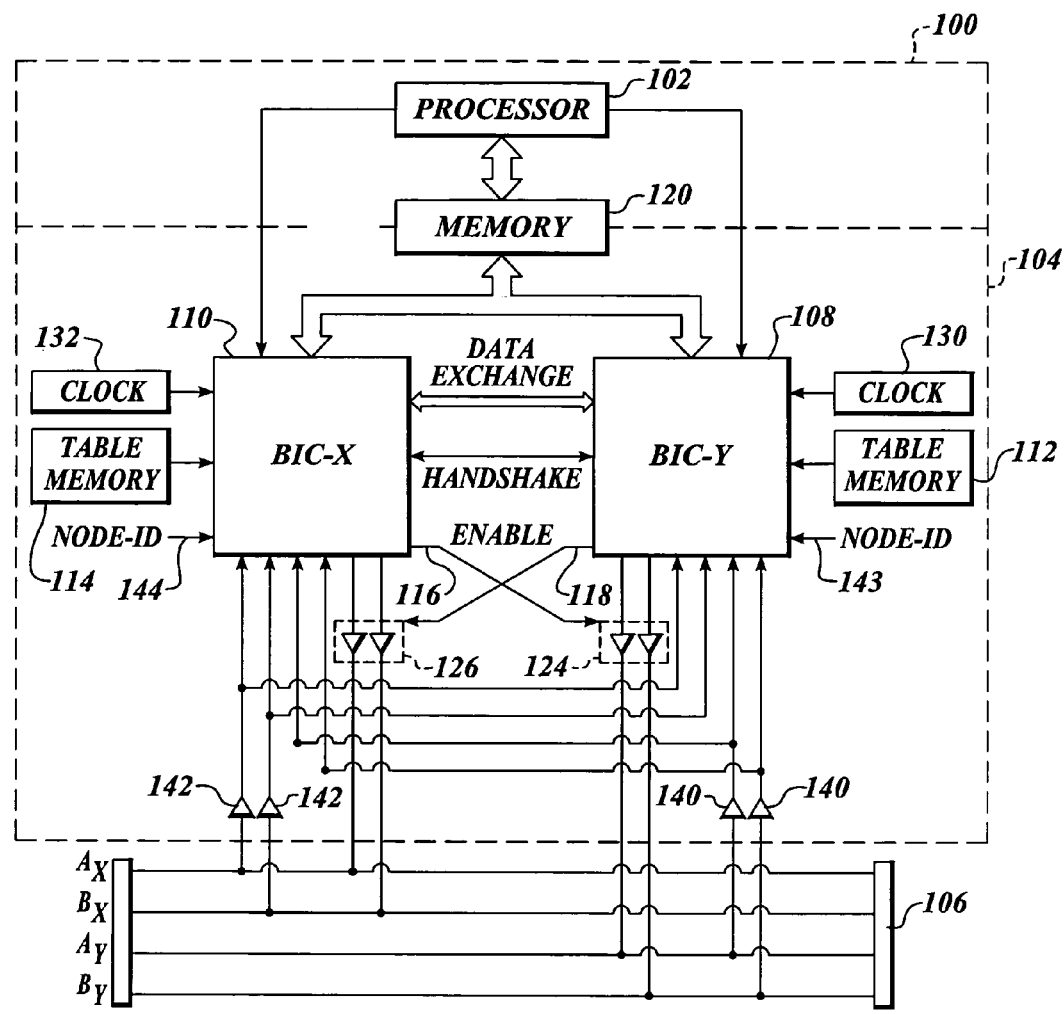
FIG. 2 is a block diagram of a node of a data bus system utilizing a single processor and a pair of bus interface controllers according to co-pending application Ser. No. 09/009,463.

FIG. 2 illustrates an example of a basic backplane bus architecture as disclosed in above incorporated U.S. application Ser. No. 09/009,463. The basic backplane bus architecture includes a node 100 containing a single processor 102, such as a microprocessor, of the data bus system according to the invention. The backplane bus architecture provides a high-integrity, time-multiplexed data bus for the purpose of transferring digital data between nodes within the same system enclosure. The processing node 100 consists of the processing entity 102 that can host multiple application functions, including input/output functions, if the node is an I/O module for example, and a backplane bus interface 104. Node 100 is connected to a set of four bus signal lines, Ax, Bx, Ay and By indicated by a reference numeral 106. In the preferred embodiment, there is no centralized control of the bus. The bus interface 104 includes the following major components: a pair of Bus Interface Controllers ("BICs") 108 and 110; independent clock oscillators 130 and 132; a pair of independent table memories 112 and 114; backplane transceivers; and physical-ID ports. In a preferred embodiment disclosed in above incorporated application Ser. No. 09/009,463, bus 106 has four transmission lines in a dual—dual configuration. Each node 100 contains two BICs 108 and 110. The purpose of BICs 108 and 110 is to manage all data transfers between bus 106 and a memory 120 associated with host processor 102. They format data-to-be-transmitted into messages, and transmit them onto bus 106 during uniquely designated time slots. BICs 108 and 110 independently determine if such a time slot is coming up, and cross-enable each other's bus line drivers using a pair of enable lines 116 and 118 accordingly. In addition, BICs 108 and 110 perform decoding, cross-checking and fault detection on received data. Each BIC-pairs 108 and 110 also synchronizes to BIC-pairs in other nodes.

Figure 3A:
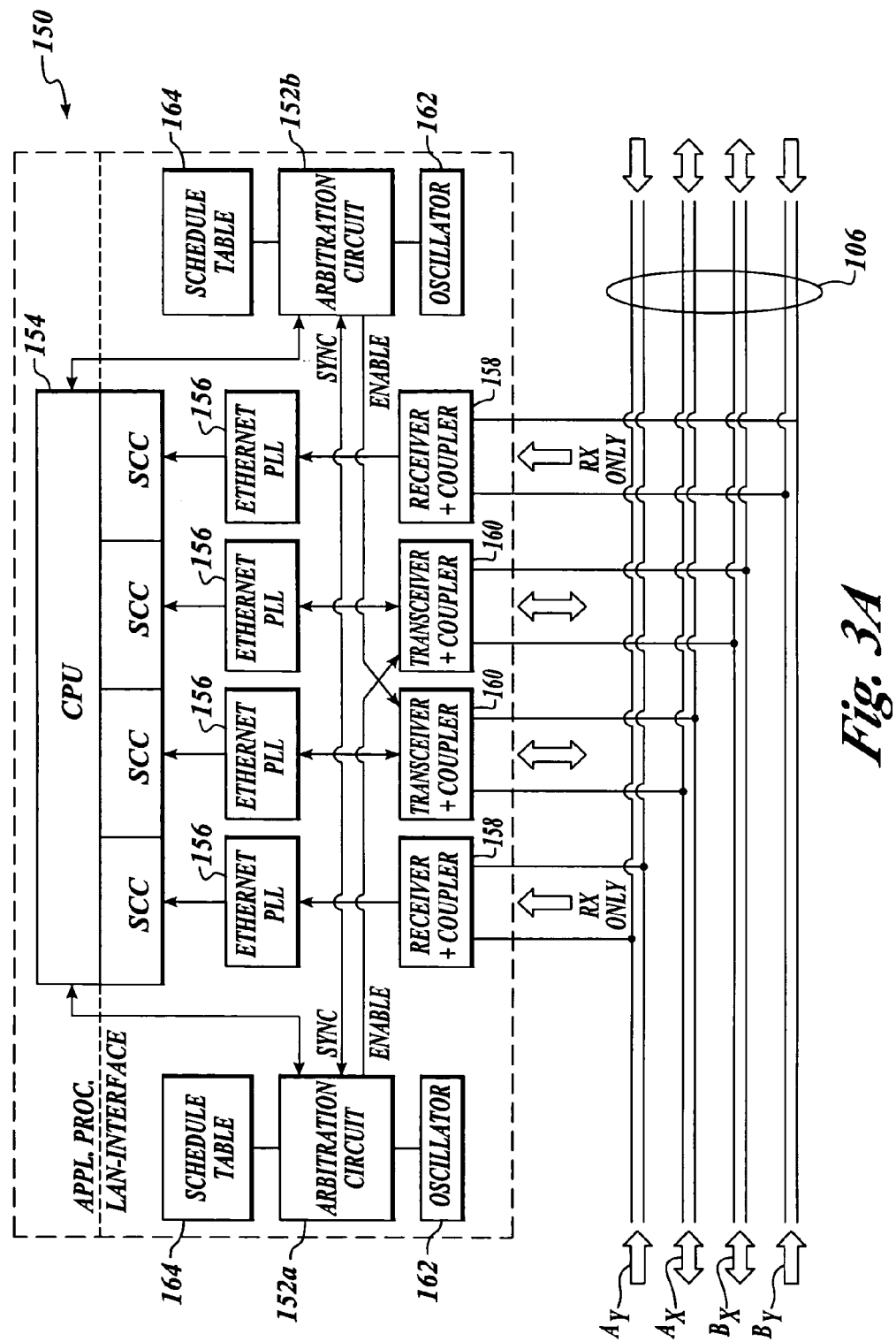
FIG. 3A illustrates an example of an alternative backplane bus architecture including a processing node of the data bus system according to co-pending application Ser. No. 09/454,054, wherein the processing node includes a processor capable of hosting multiple application functions and a backplane bus interface.
Figure 3B:
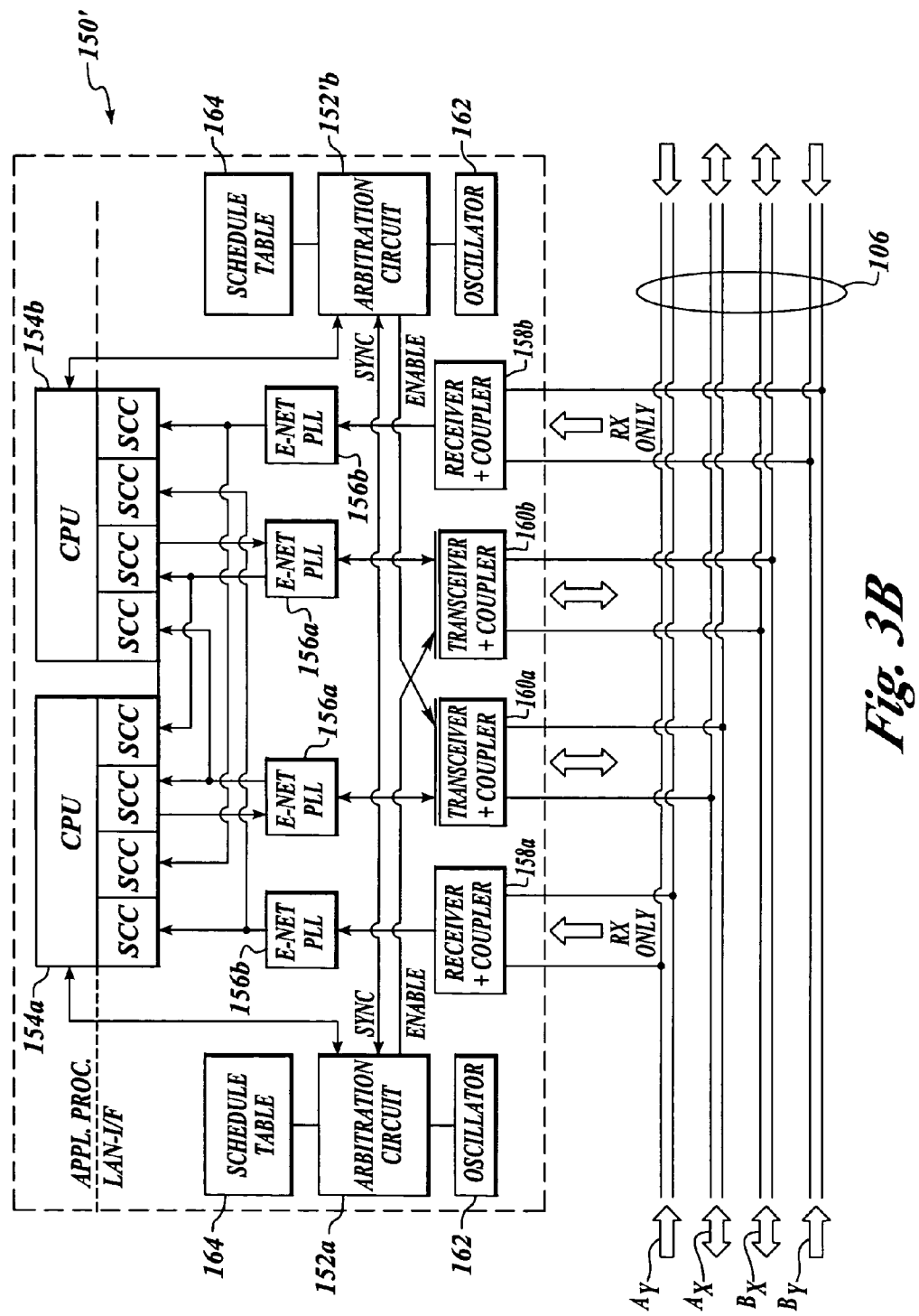
FIG. 3B is a block diagram of a node of the data bus system utilizing two processors and two arbitration circuits according to co-pending application Ser. No. 09/454,054.

FIGS. 3A and 3B illustrate examples of an alternative backplane bus architecture as disclosed in above incorporated U.S. application Ser. No. 09/454,054. According to the alternative backplane bus architecture, processing nodes are grouped into multiple physically isolated resource enclosures, one or more processing nodes per enclosure. The processing node is connected to a set of four bus signal lines, Ax, Bx, Ay and By, as indicated by reference numeral 106 in FIG. 3A. Bus 106 has four transmission lines in a dual—dual configuration. Each node includes a microprocessor having transmission privileges on one or more of the data lines of the bus 106 during uniquely designated time slots. In preferred embodiments of the invention, each node contains the two arbitration circuits that manage all data transfers between the bus 106 and a memory associated with the host processor. The two arbitration circuits independently determine if such a time slot is coming up, and cross-enable each other's bus line drivers accordingly. In other words, transmission only occurs if both arbitration circuits of a arbitrator-pair agree. Each arbitration circuit-pair also synchronizes to circuit-pairs in each of the other nodes having transmit privileges on the same bus.

Time allocation on the individual networks, commonly referred to as time partitioning, is administered by network arbitration circuits, or arbitrators, within each processing node. The network arbitrator functions in both single and dual processing lane architectures. FIG. 3A illustrates the network arbitrator in a node having a single processor interface, while FIG. 3B illustrates the network arbitrator in a node having a dual processor interface. In FIG. 3A, a node 150 having a single processor interface includes two network arbitrators 152 interfaced to a single processor 154 capable of hosting multiple application functions. Processing node 150 includes an Ethernet® phase lock loop (PLL) circuit 156; two backplane receivers 158a and 158b; and two backplane transceivers 160a and 160b.

As disclosed in above incorporated U.S. application Ser. No. 09/454,054, arbitrators 152 provide synchronization and cross-enabling functionality. Arbitrators 152 act analogously to a switch for opening access between processor 154 and the data lines during the time period when node 150 is permitted to transmit. Arbitrators 152 open access to the data lines by enabling transceiver 160 and informing processor 154 that the access is open. Arbitrators 152 regulate the opening and closing of the access between processor 154 and the data lines by synchronizing both with counter-part arbitrator 152a or 152b internal to node 150 and with other nodes 150, according to clock oscillator 162 and an independent table memory 164. Each of arbitrator 152a and 152b signals associated processor 154 when access is open. Thus, arbitrators 152 manage all data transfers between the bus lines and an application memory portion of host processor 154.

Fault Tolerant Data Communication Network

According to the invention, processing nodes are grouped into multiple physically isolated resource enclosures, one or more processing nodes per enclosure. An alternative backplane bus architecture includes multiple independent data communication networks or local area networks (LANs), each having two or more data communication lines. Each processing node transmits on all the sub-busses of one communication network, simultaneously broadcasting identical data on each data line. Each data communication network is extended in its entirety from the processing node or nodes in each resource enclosure to the processing node or nodes in each other resource enclosure. Broadcasting privileges for different ones of the data communication networks are dedicated to the processing nodes in one enclosure. The data communication network used for broadcasting by the processing nodes in one enclosure are monitored in a receive-only mode by the processing nodes in each other enclosure. Data transmissions are thereby received by all processing nodes in all enclosures. Furthermore, the individual data communication networks are isolated from one another so that transmission synchronization between the processing nodes of different enclosures is not needed.

According to preferred embodiments of the invention, each individual network, or data line, of each data communication network includes a single data bus on which data is transferred in serial fashion, using standard protocol for serial communication. Alternatively, data is transferred in parallel fashion. Thus, the preferred minimization of the number of physical connections associated with the networks is satisfied. Data communication networks are preferably formed as high speed data communication networks capable of supporting any local area network (LAN) protocol, including Ethernet®, 10Base-T, and fast Ethernet or 100Base-T. Alternatively, data communication networks support fiber optic Ethernet variations that allow the network's capabilities to be expanded to greater physical distances.

Network Topology

The network topology backplane bus architecture of the invention includes multiple processing nodes sharing multiple independent data communication networks, each independent data communication network or bus including multiple independent data lines. Each processing node has both transmit and receive privileges on a subset of the data lines of each of multiple independent data communication networks, but is restricted to receive only privileges on a second subset of the data lines. Each processing node receives data transmissions broadcast by other processing nodes on the second subset of the data lines. The processing nodes use their transmit and receive privileges on the first subset of data lines for all of: local communication within the processing node, broadcasting transmissions to other processing nodes, and receiving data transmissions from other processing nodes. Use of the first subset of data lines is time-shared by all of the processing nodes having transmission privileges in synchronization with the other processing nodes also having transmission privileges on the first subset of data lines. The processing nodes enjoying transmit and receive privileges on the first subset of data lines are preferably co-located in a first resource enclosure or cabinet. Preferably, one or more processing functions, for example, flight critical functions, are duplicated in additional processing nodes located in a second physically isolated resource enclosure or cabinet. Each of the data communication networks is extended to the additional processing nodes in the second enclosure. The processing nodes in the second enclosure are connected to each of the first and second data communication networks but are restricted to receiving transmissions from the first subset of data lines while they each enjoy both receive and transmit privileges on the second subset of data lines.

The processing nodes in the first enclosure continue to function and communicate with one another using the first network if an "active/on" failure in the other enclosure prevents data transfer on the second network. Similarly, the processing nodes in the second enclosure continue to function and communicate with one another using the second subset of data lines if an "active/on" failure in the first enclosure prevents data transfer on the subset of data lines. Thus, the processing nodes in either enclosure can continue to function and communicate with one another on one network if an "active/on" failure in the other enclosure prevents data transfer on the other network. Data transfer on any network or subset of data lines is unaffected if any processing nodes fail in a "passive/off" mode, thus still active processing nodes continue to communicate on each of the data communication networks.

Figure 4A:
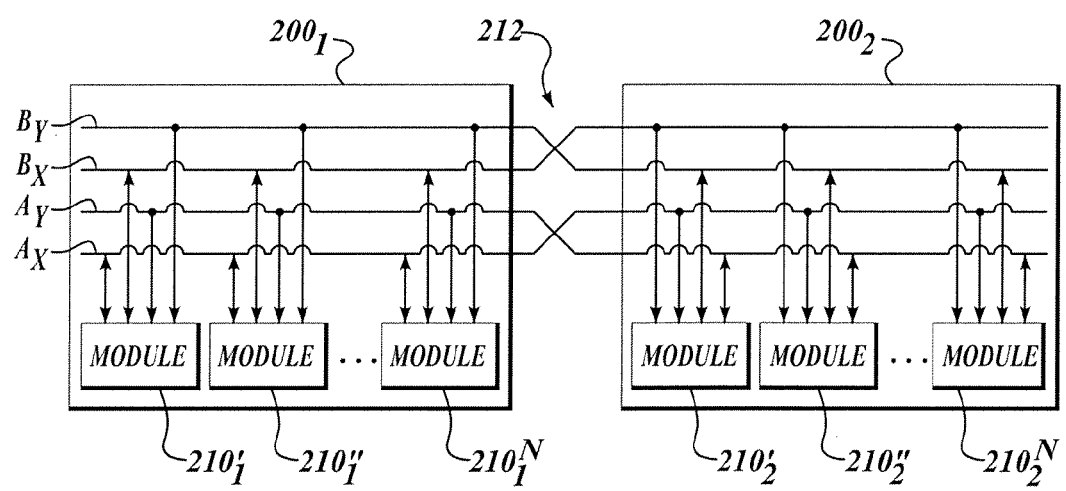
FIG. 4A illustrates an example of an alternative backplane bus architecture according to the invention, including two resource enclosures, wherein processing nodes in contained in each resource enclosure have full reception privileges on all sub-busses of each data communication network but are restricted to transmitting on less than all of the sub-busses.

FIG. 4A illustrates an example of a network topology backplane bus architecture including two or more resource enclosures or cabinets $200_1$, $200_2$ through $200_N$ (not shown). Resource enclosures each include two, or more modules, each module hosting one or multiple application functions and sharing a backplane bus 212. Multiple modules are preferably divided into two groups physically isolated in resource enclosures $200_1$ and $200_2$. For example, three or more modules $210_1'$, $210_1''$ through $210_1^N$ are installed in one resource enclosures $200_1$ and another three or more modules $210_2'$, $210_2''$ through $210_2^N$ are installed in another physically isolated resource enclosure $200_2$. Within each resource enclosure 200 modules 210' through 210" intercommunicate via fault tolerant data bus 212 of the invention. The two groups of modules $210_1'$ through $210_1^N$ and modules $210_2'$ through $210_2^N$ also intercommunicate via fault tolerant data bus 212 of the invention.

The network topology backplane bus 212 of the invention includes multiple sets of independent data communication networks. Each module 210 broadcasts to all other modules 210 in each enclosure 200 and receives input from all other modules 210 in its own and other enclosures 200, but modules 210 within each enclosure 200 transmit or broadcast on a different independent data communication network. In the preferred embodiment shown in FIG. 4A, the network topology backplane bus 212 preferably includes two sets "A" and "B" of two multi-transmitter/multi-receiver data sub-busses "x" and "y" forming four transmitter/receiver sub-busses Ax, Ay, Bx, By. Each group of modules 210 are permitted to transmit on only two of the four data lines. For example, modules $210_1'$ through $210_1^N$ of resource enclosure $200_1$ are permitted to transmit on the two "x" data lines Ax, Bx, while modules $210_2'$ through $210_2^N$ of resource enclosure $200_2$ are permitted to transmit on the two "y" data lines Ay, By. Each of modules $210_1'$ through $210_1^N$ and modules $210_2'$ through $210_2^N$ are permitted to receive on all four transmitter/receiver data lines Ax, Bx, Ay, By. Modules 210 that are connected to a data communication network in a passive "receive only," or monitoring, mode cannot interfere with data traffic on the network. Thus, modules $210_1$ communicate with other modules $210_1$ locally within first enclosure $200_1$ via "x" sub-buses Ax, Bx of first and second data communication networks A, B, respectively, and transmit data to remote modules $210_2$ within second enclosure $200_2$ via "y" sub-buses Ay, By of first and second data communication networks A, B, respectively. Similarly, modules $210_2$ communicate with other modules $210_2$ locally within second enclosure $200_2$ via "y" sub-buses Ay, By of first and second data communication networks A, B, respectively, and transmit data to remote modules $210_1$ within first enclosure $200_1$ via "x" sub-buses Ax, Bx of first and second data communication networks A, B, respectively.

Figure 4B:
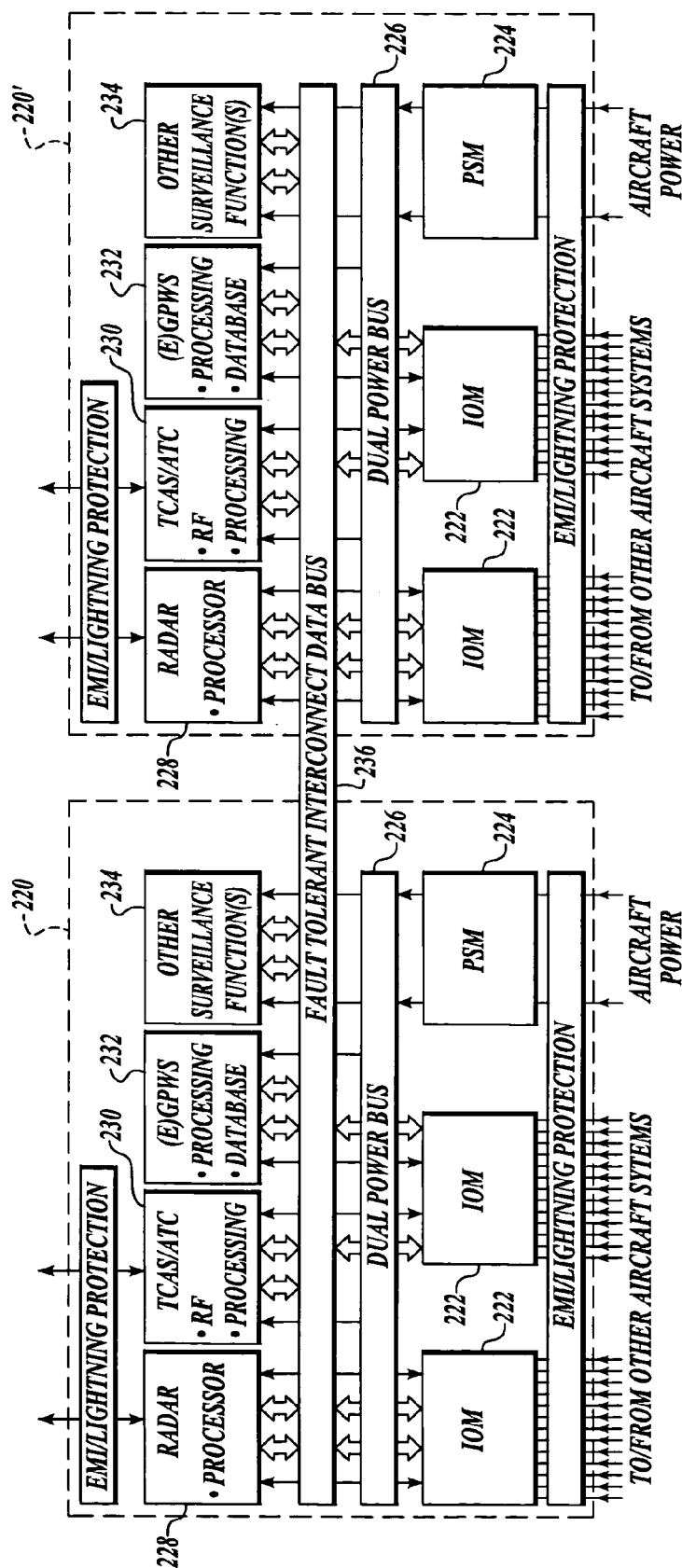
FIG. 4B illustrates an example of the backplane bus architecture illustrated in FIG. 4A applied to an integrated hazard avoidance system.

FIG. 4B illustrates one embodiment of the invention incorporating the microprocessor based systems of the aircraft IHAS 10 system, shown in FIG. 1. In FIG. 4B, IHAS 220 system module may host applications of any criticality level from non-essential to flight critical. As described above, the central computer 18 (shown in FIG. 1) of the IHAS 220 system uses conventional programs for generating the basic ground proximity warnings (GPWS) including enhanced ground proximity warnings (EGPWS), windshear warnings including predictive an reactive windshear alerts, and TCAS alerts, other surveillance functions may also be included. In FIG. 4B, IHAS 220 module is configured as a line replaceable unit, or LRU, having access through one or more I/O modules 222 to and from other aircraft systems, including, for example, central computer 18. Aircraft power is supplied via a power supply module 224 to a power bus 226 accessible by all the processing functions. The processing functions include, for example, radar processing 228, TCAS/ATC processing 230, GPWS or EGPWS processing 232 as well as other surveillance functions 234. Radar processing 228 preferably has direct access to radar antenna inputs while TCAS/ATC processing 230 has direct access to transponder signals. IHAS LRU 220 module includes a fault tolerant network topology backplane bus 236 of the invention that includes multiple sets of independent data communication networks. Each processing unit 228, 230, 232, 234 has both transmit and receive privileges on each of two data lines included in a first data communication network and monitors transmissions on a second pair of data lines forming a second data communication network.

One preferred embodiment of the present invention provides additional processing redundancy by providing that the two pairs of individual data communication networks are used for data communication within and between two redundant sets of processing nodes in different physically isolated enclosures. In FIG. 4B, network topology backplane bus 236 extends from the single IHAS LRU 220 module shown to a second redundant IHAS LRU 220' module having the same functional processing capabilities. Thus, radar processing 228, TCAS/ATC processing 230, GPWS or EGPWS processing 232 and other surveillance functions 234 are repeated in second IHAS LRU 220' module. Similar processing nodes included in second IHAS LRU 220' module have both transmit and receive privileges on each of two data lines included in the second data communication network and monitors transmissions on the pair of data lines forming the first data communication network.

Flexible Topology

Figure 5:
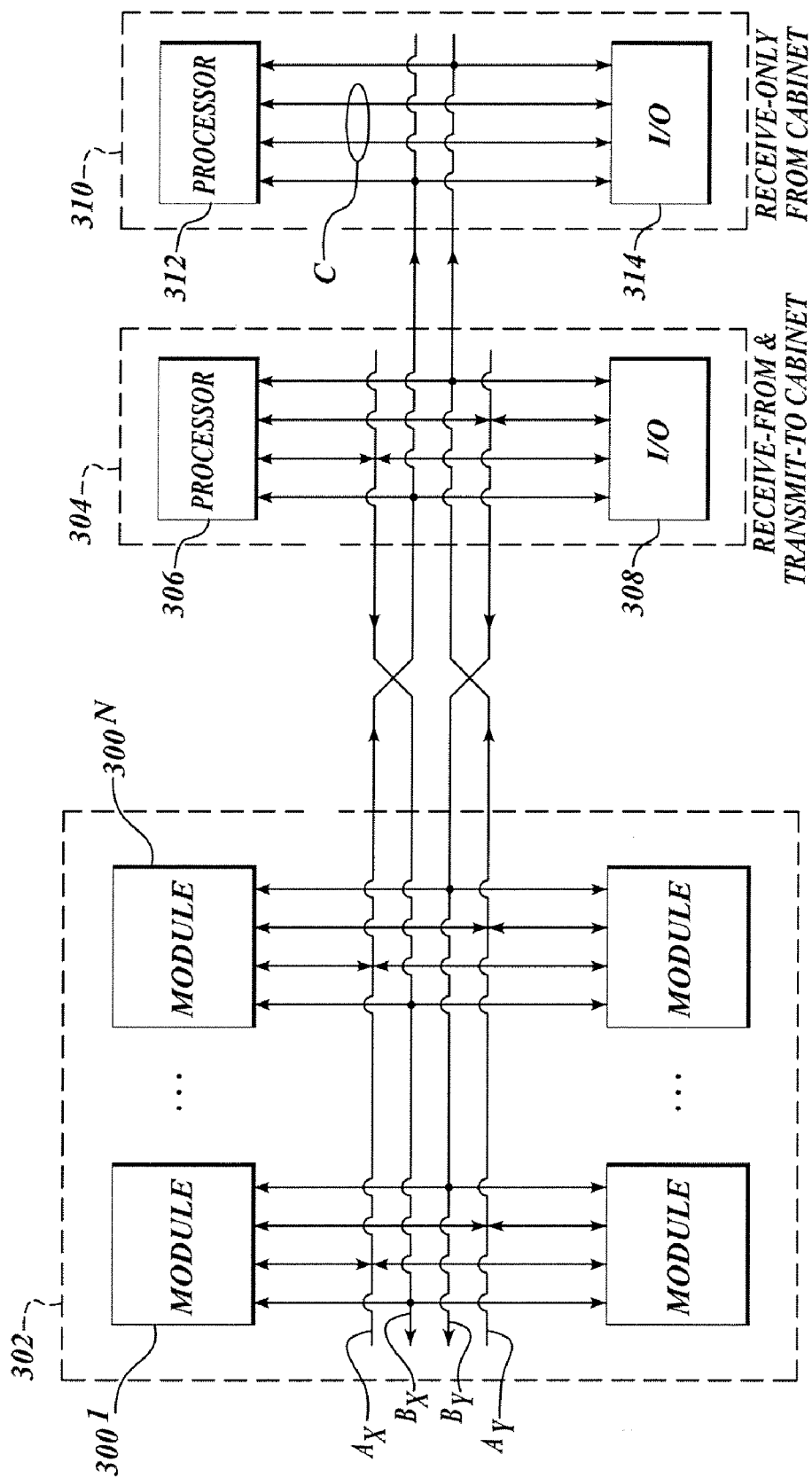
FIG. 5 illustrates the flexibility of the fault tolerant backplane bus architecture of the invention disclosed in FIGS. 4A and 4B, wherein the network topology backplane bus architecture of FIG. 4 is combined with one or more stand-alone line replaceable unit or LRU, each including one or more function modules.

FIG. 5 illustrates the flexibility of the fault tolerant backplane bus architecture of the invention disclosed in FIGS. 4A and 4B. In FIG. 5, the network topology backplane bus architecture of FIG. 4 is combined with one or more stand-alone line replaceable units or LRU 302, each including one or more function modules $300^1$ through $300^N$. Modules $300^1$ through $300^N$ may host multiple application functions that also share the backplane bus. In FIG. 5 two independent and isolated data communication networks "A" and "B" having data lines Ax, Ay and Bx, By, respectively, are shared by a first quantity of modules $300^1$ through $300^N$ co-located in the resource enclosure 302. Modules $300^1$ through $300^N$ enjoy both transmission and reception privileges on "x" data lines Ax and Bx of data communication networks A, B, respectively. Modules $300^1$ through $300^N$ each use "x" data lines for all of: local communication within the processing node, broadcasting transmissions to other processing nodes, and receiving data transmissions from other processing nodes. Modules $300^1$ through $300^N$ are restricted to receive only privileges on "y" data lines Ay, By of data communication network A, B, respectively. Each data communication network A and B is extended to interconnect with one or more remotely located line replaceable units or LRU 304 including, for example, processor 306 and I/O module 308 for exchanges with other aircraft systems. Optionally, LRU 304 is either an additional processing function or a redundant flight critical processing function also included in enclosure 302 as one of modules $300^1$ through $300^N$.

LRU 304 receives transmissions from modules $300^1$ through $300^N$ in enclosure 302 on "x" data lines Ax and Bx and transmit data to modules $300^1$ through $300^N$ on "y" data lines Ay, By. As described above, LRU 304 is restricted to receive only privileges on "x" data lines Ax and Bx, but has both transmit and receive privileges on "y" data lines Ay, By. LRU 304 uses its transmit and receive privileges on "y" data lines for local communication of private messages, broadcasting transmissions to modules and/or processing nodes, and receiving data transmissions from other LRUs, modules and/or processing nodes.

Additionally or optionally, data communication is extended to another LRU 310 having, for example, a processor 312 and an I/O module 314. Accordingly, "x" data lines Ax and Bx of data communication networks A, B, respectively, on which modules $300^1$ through $300^N$ transmit data, are extended to one or more remotely located LRU 310 such that data transmitted by any of modules $300^1$ through $300^N$ is available to each LRU 310. Each LRU 310 is interconnected to receive transmissions on "x" data lines Ax and Bx but is restricted from broadcasting transmissions of its own on these data lines. Thus, any failure of an LRU 310, either "active/on" or "passive/off," does not affect the ability of modules $300^1$ through $300^N$ transmitting and receiving on the affected network, which continue uninterrupted service. As described above, each independently configured LRU 310 includes an additional data communication network C, preferably having multiple data lines. Each LRU 310 uses dedicated data communication network C for local communication. Fault tolerance is provided by having processor 312 in each LRU 310 revert to a stand-alone operation and continue to operate processes that do not require information from modules 3001 through 300n in stand-alone fashion when one or more of modules 3001 through 300n fails in an "active/on" mode thus preventing other nodes from transferring data on the affected bus line.

Figure 6:
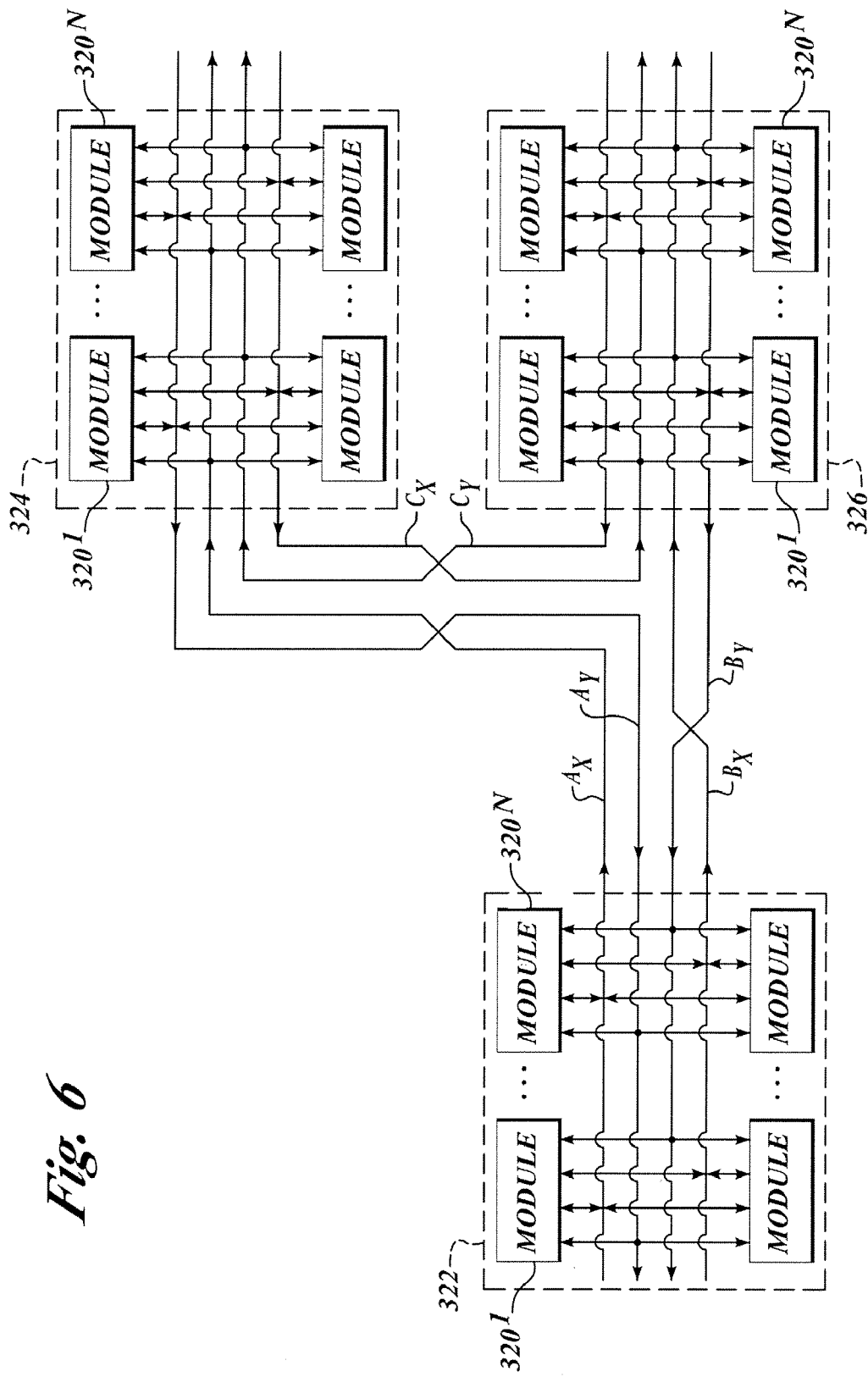
FIG. 6 illustrates an alternative embodiment of the invention having a triad configuration, wherein three or more individual data communications networks, each including multiple individual isolated sub-busses, are arranged such that processing nodes contained in each of three or more resource enclosures are interconnected with processing nodes contained in each of two or more other resource enclosures.

FIG. 6 is another illustration of the flexible topology of the present invention. In FIG. 6 multiple modules $320^1$ through $320^N$ are configured in a triad of resource enclosures 322, 324 and 326. Modules $320^1$ through $320^N$ may host multiple application functions that also share the backplane bus. The network configuration illustrated in FIG. 4 is duplicated in a first enclosure 322, wherein modules $320^1$ through $320^N$ enjoy both transmission and reception privileges on "x" data lines Ax and Bx of data communication networks A, B, respectively. Modules $320^1$ through $320^N$ in first enclosure 322 communicates with all other modules 320$^1$ through 320$^N$ over the multiple data lines Ax and Bx of first and second data communication networks A, B, respectively, as described in connection with FIG. 4. Modules 320$^1$ through 320$^N$ in first enclosure 322 are connected in a receive-only mode to the two data lines Ay and By of first and second data communication networks A, B, respectively, for receiving data transmissions from other modules 320$^1$ through 320$^N$ in additional resource enclosures, as also described in connection with FIG. 4. One each of data communication networks "A" and "B" extends to one of resource enclosures 324 and 326. For example, data communication network "A," including data lines Ax and Ay, extends to resource enclosure 324, while data communication network "B," including data lines Bx and By extend to resource enclosure 326.

Modules 320$^1$ through 320$^N$ in second enclosure 324 are connected in a receive-only mode to two data lines: data line Ax of first data communication network "A" and data line Cy of a third data communication network "C," for receiving data transmissions from modules in first and third resource enclosures 322 and 326, respectively. Modules 320$^1$ through 320$^N$ in second enclosure 324 are also connected in a receive/transmit mode to two data lines: data line Ay of data communication network "A" and data line Cx of data communication network "C," for communicating with other modules within second enclosure 324 and transmitting data to modules remotely located in first enclosure 322 and third enclosure 326, respectively. Thus, modules in second enclosure 324 communicates with modules in resource enclosure 322 via data communication network "A" and communicates with modules in resource enclosure 326 via data communication network "C."

Modules 320$^1$ through 320$^N$ in third enclosure 326 are connected in a receive-only mode to two data lines: data line Bx of second data communication network "B" and data line Cx of third data communication network "C," for receiving data transmissions from modules in first and second resource enclosures 322 and 324, respectively. Modules 320$^1$ through 320$^N$ in third enclosure 326 are also connected in a receive/transmit mode to two data lines: data line By of data communication network "B" and data line Cy of data communication network "C," for communicating with other modules within third enclosure 326 and transmitting data to modules remotely located in first enclosure 322 and second enclosure 324, respectively.

Thus, the topology of the network backplane bus illustrated in FIG. 4 is extended to modules remotely located in at least one additional resource enclosure, third enclosure 326, without any change in the interfaces to the data communication networks. Modules in each resource enclosure 322, 324 and 326 interface with two data communication networks each formed of two independent data lines. Modules in each resource enclosure 322, 324 and 326 have both transmit and receive privileges on one network pair while being restricted to receive-only privileges on the other network pair. Preferably, the modules time-share the data communication network on which they have transmission privileges in synchronization with other modules also having transmission privileges on that network, but other known carrier sense multiple access/collision avoidance (CSMA/CA) schemes, such as Ethernet®, 10Base-T, and 100Base-T, are equally applicable. So far, modules in each resource enclosure 322, 324 and 326 interface with the two data communication networks as described in FIG. 4. However, the data communication networks are interconnected to other resource enclosures in a more flexible topology, whereby communication between modules in any two resource enclosures continues uninterrupted over the interconnecting network in the event one or more modules in any one resource enclosure fail in either of an "active/on" mode, preventing communications on the affected network, or a "passive/off" mode.

Additionally, communications between all of the modules in all of the enclosures continues in the event one data communication network is lost. Loss of a network interconnecting modules in any two resource enclosures, for example, network "A" interconnecting resource enclosures 322 and 324 is compensated by the combination of network "C" connecting resource enclosure 322 to enclosure 326 and network "B" connecting resource enclosure 326 to enclosure 324. Modules in third enclosure 326 route the data transmitted from modules in first enclosure 322 to second enclosure 324 and route the data transmitted from modules in second enclosure 324 to first enclosure 322. Thus, the backplane bus of the invention can be extended to provide as much as triple redundancy of one or more flight critical processing functions or can be used to isolate enhanced functions from one another or from flight critical functions.

As with the network topology illustrated in FIGS. 4A and 4B, the flexible topology of FIG. 6 can be further extended to additional modules in additional resource enclosures as indicated by arrows on sub-busses Ax, Ay, Bx, By, Cx and Cy.

Federated Topology

In a federated topology system individual data communication networks are dedicated for local communication within each resource enclosure while one or more data communication networks are time-shared by all the resource enclosures. Federated topology uses the same data communication networks as those used by the above network topology and the same processor-to-network interfaces. Only the routing of the network is different. Fault tolerance is provided by having the processing node or nodes in each enclosure revert to a stand-alone configuration, wherein the processing node or nodes in each unaffected enclosure continue to operate in stand-alone fashion when a node or nodes in an affected enclosure fail in an "active/on" mode thus preventing other nodes from transferring data on the affected bus line. Given an "active/on" failure, the federated topology backplane bus architecture provides continued functionality of processes that do not require interaction and information exchange between independent LRUs.

Nodes in unaffected enclosures continue to operate in federated fashion when a node or nodes in an affected enclosure fail in a "passive/off" mode thus leaving the bus line available for other nodes in unaffected enclosures to freely transfer data while excluding the node or nodes in the affected enclosure. Given a "passive/off" failure mode, the federated topology backplane bus architecture of the invention provides graceful degradation through the loss of one or more enhanced functions to a functionality that includes continued interaction and information exchange between functional LRUs.

Figure 7A:
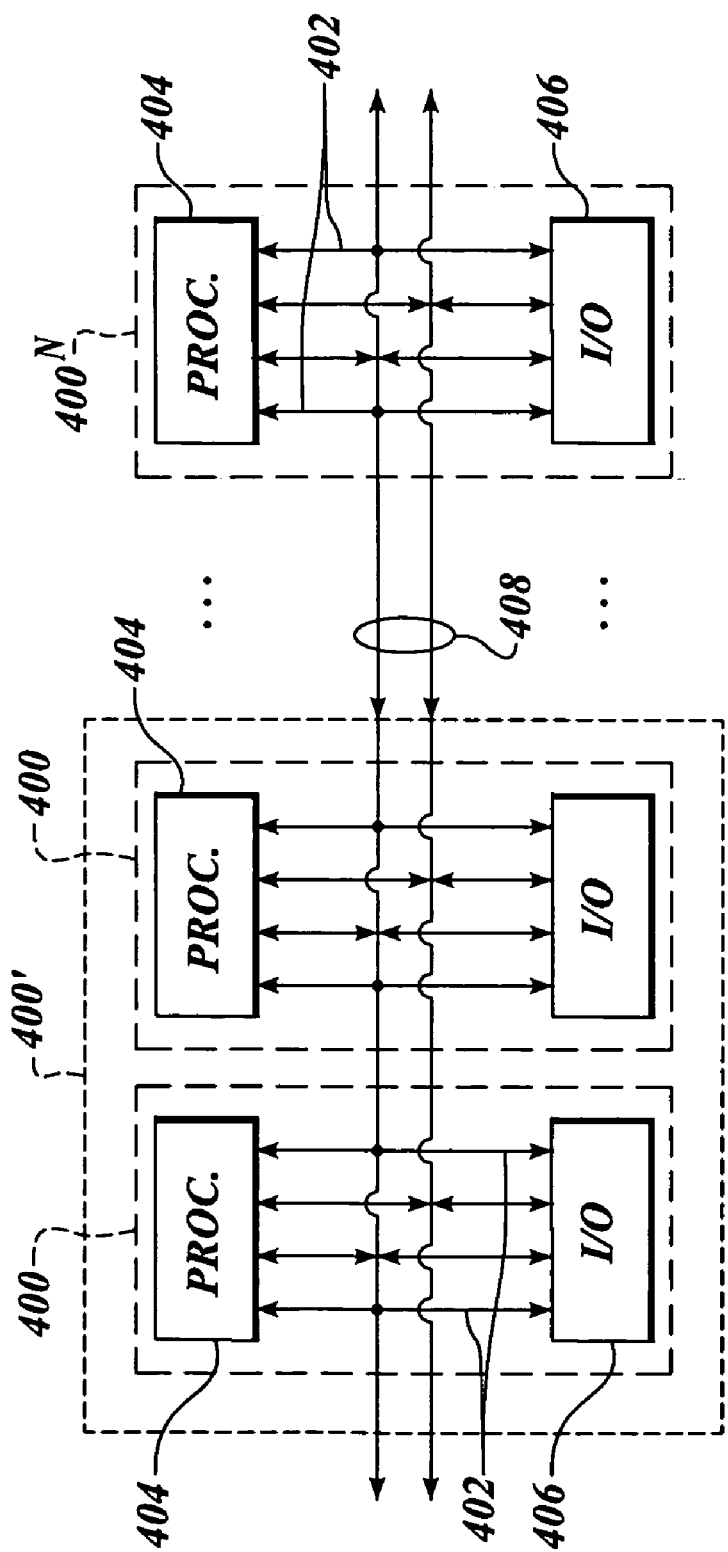
FIG. 7A illustrates an example of a federated topology backplane bus architecture of the invention, including two, three or more processing nodes formed as line replaceable units.

FIG. 7A illustrates an example of a federated topology backplane bus architecture including two, three or more processing nodes formed as line replaceable units or LRUs 400. Each LRU 400 includes a local data communication network, preferably having two or more local data lines 402, for private communication. For example, each LRU 400 includes at least a function processor 404 and an I/O module 406 for communicating with other aircraft systems. Processor 404 and I/O module 406 communicate via the local data communication network. The one or more processing nodes in each LRU 400 are interconnected to another data communication network 408 having multiple data lines. Each LRU 400 has both receive and transmit privileges on data communication network 408, preferably on a time-shared basis or another known carrier sense multiple access/collision avoidance (CSMA/CA) scheme, such as Ethernet®, 10Base-T, and 100Base-T. Optionally, two or more processing nodes, each having a processor 404 and an I/O module 406, are enclosed in a resource enclosure and together form a LRU 400'. Alternatively, when any processor 404 is a flight critical function, one or more redundant processor function 404 is provided in a one or more additional LRU $400^N$ which is physically isolated in a suitably protected fashion.

The federated topology backplane bus architecture represented in FIG. 7A by data communication network 408 provides the additional advantage of being easily expandable to include one or more additional LRU $400^N$ Additional LRU $400^N$ provides any processing function, including additional functions and redundant flight critical functions. Additional LRU $400^N$ is either physically isolated in a suitably protected fashion remotely from other LRUs 400 or co-located near or in the same enclosure 400' with other LRUs 400. In either configuration, each additional LRU $400^N$ includes a dedicated local data communication network, preferably having two or more local data lines 402, for private communication locally within the LRU. Data communication network 408 is extended to each additional LRU $400^N$ and interconnected thereto. Additional LRU $400^N$ enjoys transmit and receive privileges on data communication network 408, preferably in a synchronized time-sharing fashion with other connected LRUs 400.

Figure 7B:
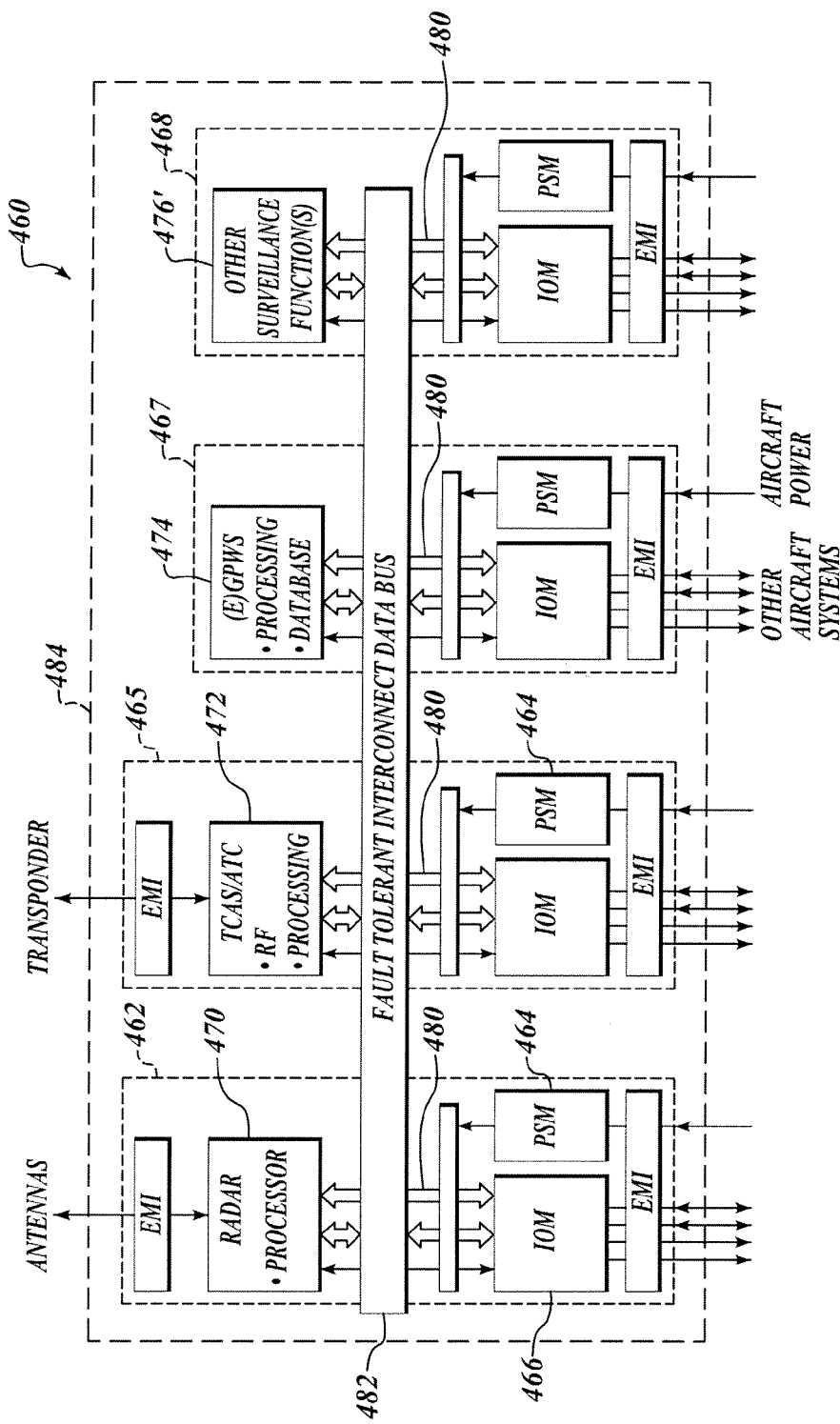
FIG. 7B illustrates one embodiment of the invention using federated topology backplane bus architecture applied to an integrated hazard avoidance system.

FIG. 7B illustrates one embodiment of the invention using federated topology backplane bus architecture and incorporating the microprocessor based systems of the aircraft IHAS 10 system, shown in FIG. 1. In FIG. 7B, IHAS 460 system is configured as multiple line replaceable units or LRUs providing processing for applications of any criticality level form non-essential to flight critical. Each LRU includes a power supply module 464 providing aircraft power to the processing node and an I/O module 466 for communication with other aircraft systems. The processing functions of IHAS 460 system are provided individually in, for example, LRU 462, LRU 465, LRU 467, and LRU 468. For example, LRU 462 includes radar processing 470; LRU 462 includes TCAS/ATC processing 472; LRU 465 includes GPWS or EGPWS processing 474; while LRU 468 includes other surveillance functions 476. Radar processing 470 preferably has direct access to radar antenna inputs while TCAS/ATC processing 472 has direct access to transponder signals. IHAS system 460 is configured using a fault tolerant federated topology backplane bus of the invention that includes multiple sets of independent data communication networks. First independent data communication networks 480 is local to radar processing LRU 462 for communication within the processing node. As shown, each other LRU 465, LRU 467 and LRU 468 include similar independent data communication networks local to the respective LRU for communication within the processing node. Second data communication network 482 is accessed in a receive/transmit mode by each LRU 462. Each LRU 462 has both transmit and receive privileges on each of two sub-busses included in second data communication network 478.

LRU 462, 465, 467 and 468 and any additional LRU containing additional processing nodes are optionally co-located in a single resource enclosure or cabinet 484. Additionally, according to one preferred embodiment of the present invention, additional processing redundancy by providing that one or more flight critical processes are provided in at least two redundant sets of processing nodes located in different physically isolated enclosures (not shown). When processing nodes are located in two or more different physically isolated enclosures, fault tolerant data communication bus 482 optionally extends between the individual enclosures and is preferably time-shared by the processing nodes of each LRU.

Bus Determinism

As described above, multiple system resources, or processing nodes, have data transmission privileges on each local area network (LAN), or data communication network, A and B. Hence, the available data transmission bandwidth on each data line, or data line, is allocated between the various processing nodes. According to above incorporated co-pending application Ser. No. 09/009,463, time allocation, or time partitioning, on the individual networks is provided by time-multiplexing on each network. Time-multiplexing provides each processing node having transmission privileges on the network a transmission time slot period having a specified frame length, thus guaranteeing maximum bandwidth and network efficiency. Above incorporated co-pending U.S. application Ser. No. 09/454,054 provides another alternative bus communication protocol for use in an Integrated Hazard Avoidance System of the type generally described above. However, the bus communication protocol described herein are provided purely as illustration; the invention is completely independent of bus communication protocol and is not intended to be limited in scope to the various illustrative protocols described herein.

Extension To Aircraft System Busses

FIGS. 4 through 7 illustrate the alternative backplane bus architecture using various local area network topologies but applied to restricted processing "domains" rather than the aircraft system buses. The invention is equally and similarly applicable to aircraft system bus networks having a dual—dual configuration, as described above. According to one alternative embodiment of the invention applied to one or more aircraft system busses, processing nodes are configured according to any of the above network topology, flexible topology, federated topology, or a combination thereof. In a preferred embodiment, the aircraft system bus is configured of multiple data communication networks, or local area networks (LANs), each formed of multiple data lines. Each processing node uses the above described interface to transmit on one group of sub-busses, simultaneously broadcasting data on each of one or more sub-busses, and receives on one or more sub-busses forming another network group. Preferably, redundant processing nodes repeated in different resource enclosures have transmit/receive privileges different ones of the sub-busses of different data communication networks to provide maximum fault protection.

Figure 8:
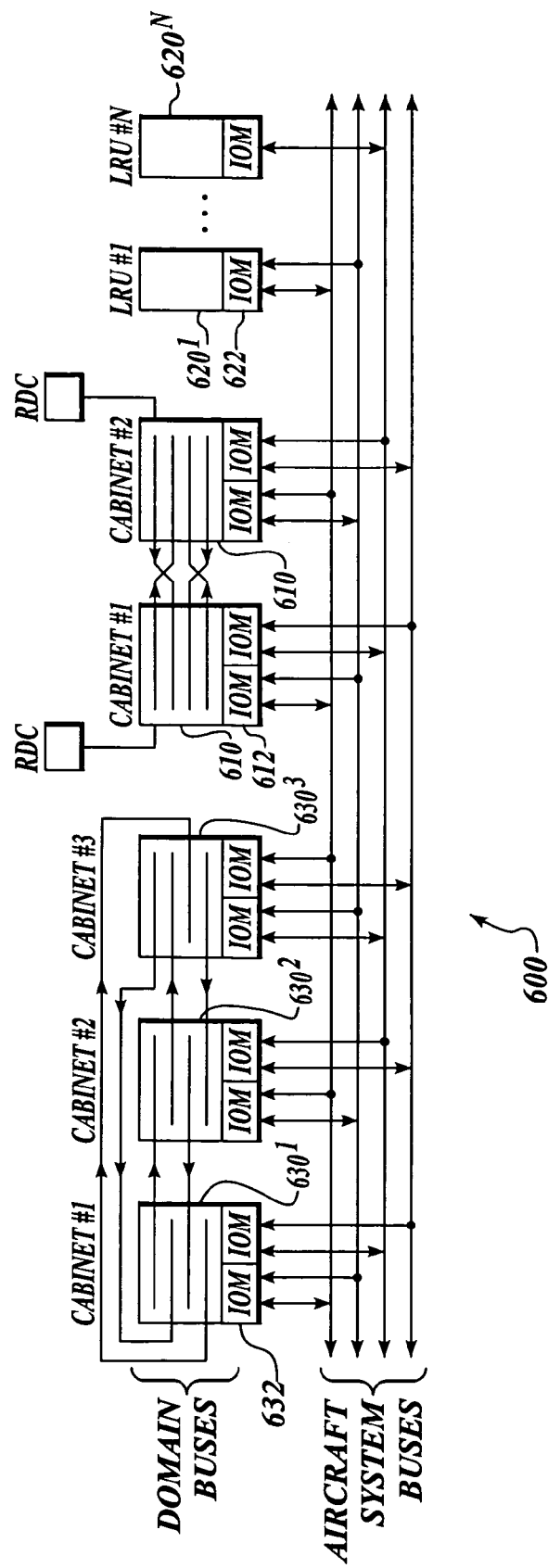
FIG. 8 illustrates the alternative embodiment of the invention applied to multiple redundant aircraft system busses.

FIG. 8 illustrates the alternative embodiment of the invention applied to multiple redundant aircraft system busses. In FIG. 8, an aircraft system 600 includes one or more modules or processing functions formed as multiple resource enclosures, or cabinets, 610 in accordance with the network topology backplane domain bus architecture of the invention; enclosures 620 in accordance with the federated topology backplane domain bus architecture of the invention; and enclosures 630 in accordance with the flexible topology backplane domain bus architecture of the invention, for example, the triple cabinet configuration illustrated in FIG. 6. The modules of each enclosure 610, 620, 630 communicate with modules in others enclosures using the domain data communication networks as described above.

In FIG. 8 the modules of each enclosure 610, 620, 630 are connected for communication with other resources on the aircraft system busses via I/O modules 612, 622 and 632, respectively. Enclosures 610 joined in accordance with network topology preferably follow the protocol described above, wherein each of two I/O modules is coupled in a receive-only mode to receive data transmissions on one data line, or data line, of one data communication network and is coupled to both transmit and receive on one data line of another network. Thus, enclosures 610 configured using a dual—dual redundancy scheme for inter-enclosure communication use a similar scheme for communication over the aircraft bus.

Enclosures $620^1$ through $620^N$ joined in accordance with federated topology preferably follow the protocol described above, wherein a local network is used exclusively for private communication within each line replaceable unit, or LRU, and an I/O module couples the LRU in a receive-only mode to both transmit and receive on one network. Thus, enclosures 620 can stand-alone and continue to communicate with other aircraft systems over the aircraft bus. Additionally, domains formed using federated topology may use one or more of the aircraft system data communication networks for local communication among themselves. According to one alternative embodiment, each LRU is also coupled with the aircraft system bus in a receive-only mode, as shown.

Enclosures 630 configured in accordance with one of the above described flexible topology schemes, for example, in a three-cabinet scheme, preferably follow the protocol described above, wherein one or more processing modules within different resource enclosures $630^1$, $630^2$ and $630^3$ are communicate with modules in each of the other enclosures using the dual—dual redundancy scheme for inter-enclosure communication. Modules $630^1$, $630^2$ and $630^3$ may host multiple application functions that also share the backplane bus.

One or more I/O module 632 of each enclosure 630 couples the resource to the aircraft system bus using a dual—dual redundancy scheme. Preferably, the transmit/receive privileges of each I/O module 632 of each resource enclosure 630 interfaces to a different network pair and the more restrictive receive-only connections also interface to a different network pair, as described above. Furthermore, in a preferred embodiment, the transmit/receive interfaces and the receive-only interfaces for each of enclosures 630 occur on a distributed selection of the aircraft system networks, such that maximum interface redundancy is provided, as shown.

Those of ordinary skill in the art will recognize that the data rate of the domain networks can vary from that of the aircraft system networks without affecting the practice of the invention. Furthermore, the alternative backplane bus architecture of the invention using local area network domain topologies can be practiced using a one or any combination of different ones of the above described topologies.

While the preferred embodiment of the invention has been illustrated and described, it will be appreciated that various changes can be made therein without departing from the spirit and scope of the invention. Furthermore, although the preferred embodiment of the invention as disclosed above is particularly suited to aircraft safety and warning systems such as the IHAS described above in connection with FIG. 1, it will be appreciated that the data bus system of the invention could find application in many data processing applications where data integrity and fault tolerance are important. Also, it will be apparent that modifications of the particular system described above could be made by those who are skilled in the art that would fall within the scope of the invention claimed herein. Such modifications could arise from a number of factors including: the environment in which the data bus system is to be used, the availability and cost of hardware and the specific nature of the application.

The invention claimed is:

1. A network topology backplane bus architecture comprising:
    four independent data communication lines;
    a plurality of processing nodes sharing said independent data communication lines for data communication;
    one or more of said processing nodes associated with a first enclosure being normally connected for transmitting on first and second of said data communication lines and being normally connected for receiving on all of said data communication lines, wherein the one or more of said processing nodes associated with a first enclosure does not transmit on third and fourth of said data communication lines; and
    one or more other processing nodes associated with a second enclosure being normally connected for transmitting on third and fourth of said data lines and being normally connected for receiving on all of said data lines, wherein the one or more of said other processing nodes associated with a second enclosure does not transmit on the first and second data communication lines.

2. The network topology backplane bus architecture recited in claim 1, wherein the first and third independent data communication lines comprises a first independent data communication network and the second and fourth independent data communication lines comprise a second independent data communication network.

3. The network topology backplane bus architecture recited in claim 1, wherein said processing nodes associated with the first enclosure utilize at least one of said first and second data communication lines for local communication with other nodes associated with the first enclosure.

4. The network topology backplane bus architecture recited in claim 3, wherein said processing nodes associated with the first enclosure utilize at least one of said first and second data communication lines for broadcasting transmissions to processing nodes associated with the second enclosure.

5. The network topology backplane bus architecture recited in claim 4, wherein each of plurality of processing nodes associated with the first enclosure time-shares at least one of said first and second data communication lines with the other processing nodes associated with the first enclosure.

6. The network topology backplane bus architecture recited in claim 5, wherein timesharing said data communication lines is synchronized.

7. The network topology backplane bus architecture recited in claim 4, wherein said processing nodes associated with the second enclosure utilize at least one of said third and fourth data communication lines for local communication with other nodes associated with the first enclosure.

8. The network topology backplane bus architecture recited in claim 7, wherein said processing nodes associated with the second enclosure utilize at least one of said third and fourth data communication lines for broadcasting transmissions to processing nodes associated with the first enclosure.

9. The network topology backplane bus architecture recited in claim 8, wherein ones of said processing nodes supports different ones of flight critical functions.

10. The network topology backplane bus architecture recited in claim 9, wherein one or more of said processing nodes supporting one of said flight critical functions is duplicated in one or more additional ones of said processing nodes.

11. The network topology backplane bus architecture recited in claim 10, wherein one of said processing nodes supporting said one of said flight critical functions is located in the first enclosure; and at least one of said additional processing nodes supporting said one of said flight critical functions is located in the second enclosure.

12. A method of sharing independent data communication lines for fault tolerant data communication among a plurality of processing nodes, the method comprising:

permitting one or more first processing nodes associated with a first enclosure transmitting privileges on a first and a second data communication lines;

permitting one or more second processing nodes associated with a second enclosure transmitting privileges on a third and a fourth data communication lines; and providing all the nodes receiving privileges on all of the data communication lines, wherein the transmitting privileges are not permitted for the one or more first processing nodes on the third and fourth data communication lines and the transmitting privileges are not permitted for the one or more second processing nodes on the first and second data communication lines.

* * * * *